Figure 1:
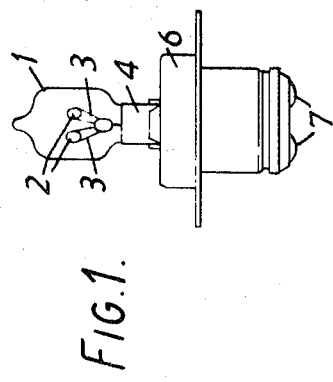

United States Patent
Coaton et al.

[15] 3,644,773
[45] Feb. 22, 1972

[54] A HYDROGEN-HALOGEN, FILAMENT LAMP WITH A HYDROGEN GETTER FLAG

[72] Inventors: James Richard Coaton; John Michael Rees, both of London, England
[73] Assignee: Thorn Lighting Limited, London, England
[22] Filed: Apr. 24, 1970
[21] Appl. No.: 31,480

[52] U.S. Cl. ............................ 313/174, 313/179, 313/222
[51] Int. Cl. ........................................ H01k 1/50, H01k 1/56
[58] Field of Search ................ 313/222, 223, 174, 178, 179

[56] References Cited

UNITED STATES PATENTS 3,453,476  7/1969  English ........................... 313/222 X
3,416,022  12/1968 Mayer ............................. 313/222 X
3,551,722  12/1970 Holcomb et al. ................ 313/222
3,132,278  5/1964  Collins et al. .................. 313/222 X 3,465,193  9/1969  Beuvens et al. ................ 313/178

FOREIGN PATENTS OR APPLICATIONS 663,290  12/1951  Great Britain ................. 313/178

Primary Examiner—Roy Lake
Assistant Examiner—Palmer C. Demeo
Attorney—James Theodosopoulos

[57] ABSTRACT

Alkyl iodides and other hydrogen and halogen containing compounds are employed in the fill of tungsten-halogen cycle electric incandescent lamps, means being provided in the lamp envelope for combining with hydrogen to reduce the hydrogen content of the reactive system of the fill whereby recombination of the hydrogen and halogen can be minimized, thus providing a maximum content of halogen in the fill for supporting the regenerative tungsten-halogen cycle. Where an alkyl iodide constitutes the hydrogen and halogen containing component of the fill the hydrogen-combining means may be dispensed with.

3 Claims, 3 Drawing Figures

PATENTED FEB 22 1972  3,644,773

JAMES RICHARD COATON
JOHN MICHAEL REES
INVENTORS

BY  James Theodoropoulos
AGENT

A HYDROGEN-HALOGEN, FILAMENT LAMP WITH A HYDROGEN GETTER FLAG

The present invention relates to tungsten-halogen cycle electric incandescent lamps.

In operation of these lamps a halogen element acts in association with tungsten vapor evaporated from the filament to minimize deposition of tungsten on the envelope wall.

In a first aspect the invention relates especially to tungsten-iodine cycle electric incandescent lamps. Whereas close control of the quantity of iodine present is necessary in order to achieve optimum efficiency of the regenerative cycle, it is difficult to introduce iodine into a lamp in the correct quantity. In a known method of lamp filling the lamp envelope is exhausted and heated to remove air and residual impurities and the envelope is filled by passing an inert gas through a reservoir containing iodine heated to give the required SVP, and to the envelope. This method has the disadvantage that the gas-filling apparatus between the reservoir and envelope must be maintained at the reservoir temperature to avoid loss of iodine by condensation. The use of hydrogen iodine vapor in gas filling has been suggested as a means for avoiding this disadvantage. However, in the presence of small quantities of moisture hydrogen iodide is reactive with the metals and lubricants usually used in the gas-filling apparatus.

In accordance with a first aspect of the invention there is provided a tungsten-iodine cycle electric incandescent lamp having a fill including an alkyl iodide which yields iodine when heated. The preferred iodide is methyl iodide.

In the manufacture of lamps according to the invention the lamp envelopes can be filled with a premixed gaseous mixture of the usual inert gas or gases and the alkyl iodide. This method has the advantage that the premixing can be carried out in bulk thus reducing the risk of contamination and providing a means of supplying a repeatably accurate quantity of iodine. In addition the use of alkyl iodides avoids the disadvantage associated with the use of hydrogen iodide in that the alkyl iodides do not react with the metals and lubricants usually used in the gas-filling apparatus.

The proportion of alkyl iodide needed in the inert gas-alkyl iodide mixture depends upon the composition of the iodide, the type of lamp to be filled and the characteristics of the gas-filling apparatus employed. In the case of methyl iodide there may be employed, for example, from 0.05 to 5 volume percent of methyl iodide in the mixture, based on the volume of the mixture.

In a further two aspects the invention relates especially to tungsten-halogen cycle electric incandescent lamps having a fill including a hydrogen and halogen containing compound which yields halogen when heated. It has been found that in some types of lamps, for example long life linear lamps having a fill including an alkyl halide, for example methyl iodide, insufficient halogen is released in operation to support the regenerative cycle.

In second and third aspects the present invention provides means for removing hydrogen from the reactive system of the fill whereby more halogen is released to support the regenerative cycle.

Figure 2:
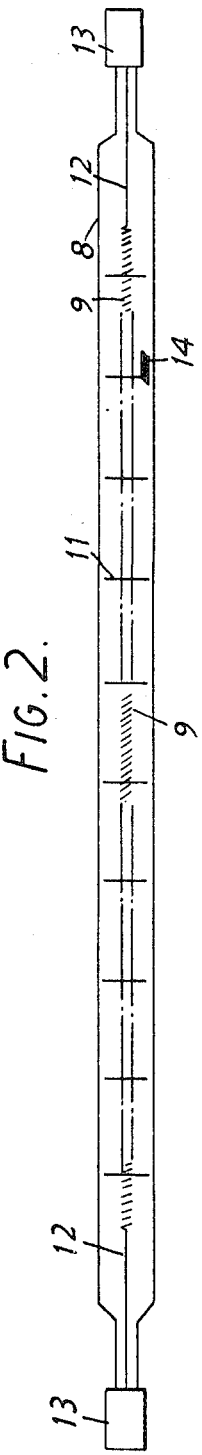
Figure 3:
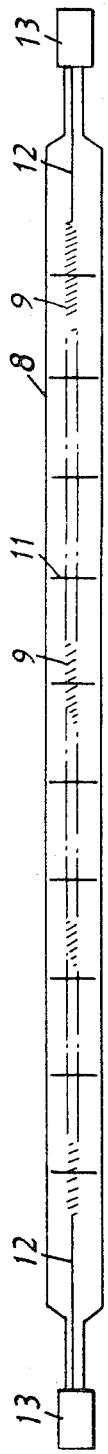

A present invention will now be described more fully, by way of example only, with reference to the accompanying drawings in which:

FIGS. 1, 2 and 3 show, respectively, tungsten-iodine with the first, second and third aspects of the present invention.

Referring to FIG. 1 a 12 v. 55/55 w. twin filament lamp has a closed quartz envelope 1 having two tungsten filaments 2 supported therein on respective filament legs 3. The envelope is provided with a metal end cap 4 provided with two contacts which are connected through lead-in wires sealed through the envelope 1. Each of the contacts is connected to one end of a respective one of the two filaments 2 and the other end of each filament 2 is connected to the metal of the end cap 4.

In the embodiment shown in the drawing, the lamp is seated in a hollow cylindrical base member 6 provided with two contacts 7 connected respectively to the two contacts on the metal end cap 4. The envelope 1 is filled with a mixture containing substantially 99.5 volume percent argon and 0.5 volume percent methyl iodide, to give a pressure of 2 atmospheres at room temperature. In operation of the lamp the methyl iodide dissociates on heating to yield iodine which supports the tungsten-iodine regenerative cycle in the lamp.

In accordance with the second aspect of the invention there is provided a tungsten-halogen cycle electric incandescent lamp having a fill including a hydrogen and halogen containing compound which yields halogen when heated wherein there is included within the lamp a structure arranged to be heated by operation of the lamp for absorbing hydrogen when yielded by the fill comprising a first material which when heated absorbs hydrogen and is reactive with the halogen, the first material being protected from reaction with the halogen by a barrier of a second material which when heated is impermeable by the halogen but through which when heated hydrogen can permeate to the first material. Ti, Ta, Zr or Al or an alloy containing one or more of these metals is preferred as the first material. Pd or a Pd-Ni alloy is preferred as the second material. Attempts to use any of these metals or alloys alone have been found unsatisfactory, in that Pd or Pd-Ni alloy has an insufficient capacity for absorbing hydrogen, while the remaining metals mentioned above react with halogen and interfere with the regenerative cycle.

In a preferred form the hydrogen-absorbing structure comprises a piece of the first material coated over its entire surface with a thin layer of Pd.

The surface area and operating temperature needed for efficient working of the hydrogen-absorbing structure depend upon the choice of the first material, the internal volume of the envelope and the quantity of the hydrogen and halogen containing compound present in the fill.

The following is an example of a lamp in accordance with the second aspect of the invention.

EXAMPLE I

Referring to FIG. 2, a 240 v. 1500 w. linear lamp has a tubular closed quartz envelope 8 of internal volume 12.5 cm.$^3$. A coiled linear tungsten filament 9 is supported within the envelope 8 on a plurality of spaced filament supports 11. The filament 9 is connected by lead-in wires 12 sealed through the envelope 8 to metal end caps 13 at the ends of the tubular envelope 8. A hydrogen-absorbing structure in the form of a getter flag 14 and comprising a piece of Ti coated with Pd and having a surface area of 0.4 cm.$^2$ is mounted in the envelope 8 in a position so as to attain a temperature of approximately 650° C. during normal lamp operation. The lamp was manufactured by conventional processing except that processes where any heating is carried out in hydrogen or gas mixture containing a substantial quantity of hydrogen were avoided. The envelope was filled from a tank containing substantially 99 volume percent argon and 1 volume percent methyl iodide to a pressure of 2.5 to 3 atmospheres at room temperature. The action of the hydrogen-absorbing structure in removing hydrogen and releasing iodine was observed after approximately 1 minute of operation at normal voltage.

In accordance with the third aspect of the invention, there is provided a tungsten-halogen cycle electric incandescent lamp having a fill including a hydrogen and halogen containing compound which yields a first halogen when heated, wherein the fill additionally includes a second halogen which has a greater affinity for hydrogen than the first halogen. For example, in the case in which the hydrogen and halogen containing compound is an iodide the fill may additionally include $Br_2$, $Cl_2$ or $F_2$.

The proportion of the second halogen required in the fill depends upon the lamp type and rating.

The following is an example of a lamp in accordance with the third aspect of the invention.

EXAMPLE II

Referring to FIG. 3, a 240 v., 1500 w., 2000 hour life linear lamp has a physical structure similar to that of the lamp of FIG. 2, and the same reference numerals are used in the drawings to indicate the similar elements thereof.

The lamp was manufactured by conventional processes up to the stage of gas filling. At this stage 1 torr of $Br_2$ was introduced into the envelope 8 followed immediately by gas filling from a tank containing substantially 99 volume percent argon and 1 volume percent methyl iodide to a pressure of 2.5 to 3.0 atmospheres at room temperature. After a short period of operation of the lamp, or on standing for a period of time, release of iodine was observed.

We claim:

1. A tungsten-halogen cycle electric incandescent lamp comprising a closed high temperature-resisting light-transmitting envelope; a tungsten filament within said envelope; lead-in wires sealed through said envelope and connected to said filament; a fill within said envelope including a hydrogen and halogen containing compound which releases hydrogen and a halogen when heated; and means within said envelope for combining with said hydrogen when released to reduce the hydrogen content of the reactive system of said fill, said means comprising a structure arranged within said envelope in heatable relationship with said filament, said structure comprising a first material which, when heated, absorbs hydrogen and is reactive with said halogen, and a barrier of a second material which, when heated, is impermeable by said halogen but through which, when heated, hydrogen permeates to said first material, and disposed over said first material to protect same from reaction with said halogen.

2. A lamp according to claim 1 wherein said first material comprises a metal selected from the group consisting of Ti, Ta, Zr, Al and alloys thereof, and said second material comprises a metal selected from the group consisting of Pd and a Pd-Ni alloy.

3. A lamp according claim 1 wherein said hydrogen and halogen containing compound is an alkyl halide.

* * * * *